United States Patent Office 3,494,197
Patented Feb. 10, 1970

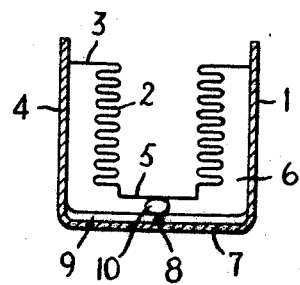

3,494,197
THERMOSTATIC ACTUATOR CHARGEABLE
BY AMPOULE THEREIN
Jorn Marius Schmidt, Nordborg, Denmark, assignor to
Danfoss A/S, Nordborg, Denmark, a company of
Denmark
Filed Apr. 24, 1967, Ser. No. 633,229
Claims priority, application Germany, Apr. 26, 1966,
D 49,950
Int. Cl. G01k 5/42
U.S. Cl. 73—368.7                               4 Claims

ABSTRACT OF THE DISCLOSURE

Method and device for charging with a temperature-responsive working fluid thermal systems of automatic operators and controllers by disposing within a working space of an actuator of the thermal system an ampoule containing a metered quantity of the working fluid. The working fluid is released into this system by opening the ampoule while contained in the working space by mechanically breaking the ampoule by actuating a part of the actuator or by applying heat to the ampoule and causing it to release its contents. In the former case the ampoule is made of a material breakable by application of a low value mechanical force and in the latter case the ampoule is made of a material meltable at a low temperature.

An actuator for a thermal system having an ampoule, containing a temperature-responsive fluid, contained therein in a working space provided with a working part for opening the ampoule at will.

---

This invention relates generally to thermal systems for self-actuating or automatic operators and controllers and more particularly to a new and improved actuator construction and a method and device for charging the thermal systems with temperature-responsive working fluids.

Heretofore in automatic control systems making use of automatic operators or controllers, for example thermostates having actuators consisting of bellows or diaphragms, the working fluid, for example a temperature-responsive fluid, is applied to the thermal system by charging the actuator with a predetermined amount of working fluid. Usually the actuator, for example a bellows or diaphragm element, is first manufactured and then is charged with the desired amount of temperature responsive working fluid. In order to accomplish this the working space of the actuator is provided with a nipple through which the charge is delivered and after charging the nipple must be squeezed and soldered together in order to seal the working space and retain the working fluid within the system. This method of charging thermal systems necessitates several manufacturing operations of providing the nipple, soldering, squeezing and removal of the nipple. A considerable number of operations and apparatus is therefore necessary to deliver an accurate or metered quantity of working fluid to the known thermal systems.

A particular disadvantage of the techniques for charging thermal systems heretofore has been that after introduction of the working fluid the actuator is exposed to the influence of working fluid which is not counteracted by a countering force. For example, a thermally charged temperature-responsive regulator having a bellows therein or actuator charged with temperature-responsive fluid can have the bellows overstressed by the working fluid unless a stop is provided in the actuator to prevent the bellows or other type system from becoming overloaded prior to final assembly of the actuator or regulator into some automatic control apparatus.

An object of the present invention is to provide a new and improved method for charging thermal systems of automatic operators and controllers.

Another object is to provide method and apparatus for charging a thermal system with a temperature-responsive working fluid without any danger of the working fluid affecting the system until an actuator in which it is contained is in its assembly in which it is to operate or in its final operating environment.

A feature of the method according to the invention is a provision of a metered charge of working fluid in an ampoule that is contained within the actuator working space of the thermal system. The ampoule is introduced into the working space before assembly of the actuator is completed. After the actuator is completely assembled the ampoule continues to contain the working fluid so that it cannot function and in any manner stress or operate the actuator; only after the ampoule is opened as desired will the working fluid become effective.

The ampoule containing the working fluid may be made of an easy-melting material that will open upon application of external heat releasing the contents of the ampoule into the working space of the actuator or the ampoule may be made of a breakable material which will be broken with application of a low value mechanical force. The ampoule can itself be broken by actuating a working part of the actuator, for example by operating a part of a bellows, which will break the ampoule and release the contents. In either type of construction, breakable or meltable ampoules, tests have shown that any residue of the ampoule remaining in the working space does not affect the functioning of the working fluid and does not impede the working parts of the actuator, for example a bellows or diaphragm type cell.

Another feature of the invention is that the ampoule can be opened while contained in the thermal system at any desired time, for example after installation of the actuator.

It has been found that plastic or glass ampoules have proved particularly satisfactory if the charge therein is to be released by mechanical opening of the ampoule. Moreover the actuator walls defining the working space may be provided with an inwardly-projecting sharp edge which can be selectively rendered effective by actuating a working part or working wall of the actuator rupturing the ampoule so that the working fluid therein is released.

Other features and advantages of the ampoule, actuator and method in accordance with the present invention will be better understood as described in the following specification and appended claims, in conjunction with the drawing illustrating a diagrammatic longitudinal section view of a bellows-type actuator or cell according to the invention after the working space thereof has been closed and before the working fluid charged therein has been charged.

The terms automatic operators and controllers as employed herein will refer to devices or apparatus operating automatically in response to temperature variations to carry out discrete functions or continuous functions in automatic control and regulating apparatus. The term actuator is defined as comprising devices for carrying out a given action intermittently, discretely or continuously as the case may be in response to and in conjunction with a working fluid responsive to temperature changes and relates to all types of devices such as bellows, diaphragms and the like used in temperature regulators, thermostats, temperature-responsive valves and the like.

The temperature-responsive working fluid as described herein refers to working fluids used in vapor-pressure type thermal systems and liquid expansion type thermal systems.

An actuator for a thermal system of an automatic operator or controller is illustrated in the drawing and comprises a bellows system having a vase 1 within which is disposed a bellows 2 having a flange 3 welded to the case along the seam 4. The bellows has a bottom 5 and the case and bellows jointly define a working space 6 of the bellows-type cell or actuator.

Between the inner surface of the bottom 5 and a bottom 7 of the case 1 are disposed cruciform sharp edges 8, 9 on which is disposed an ampoule 10 made of a synthetic material or glass. The ampoule contains a working fluid charge for the bellows system and is inserted into the working cavity before assembly of the case and bellows 2.

In the condition illustrated in the drawing in which the ampoule is disposed within the working cavity the actuator may be transported or stored in any desired manner. The ampoule is likewise constructed in this case as an ampoule material that can resist high temperatures such as are experienced during transport across the Equator. The contents thereof constitute a working fluid which is temperature-responsive and while contained in the container there is no risk of the working fluid overloading the bellows system because the working fluid is not free to apply a working force to the bellows which would be an unresisted force and would tend to damage the bellows.

After the bellows system has been installed in its contemplated equipment or operating environment, for example a thermostatic valve, the ampoule 10 is broken mechanically by simply pressing the bottom or base 5 of the bellows 2 in a direction toward the bottom 7 of the case whereby the sharp edges 8, 9 will rupture the ampoule 10. The mechanical force may be generated by applying, to the amoule, pressure developed by the adjusting spring, not shown, of the valve or by any other suitable force-applying means in the apparatus in which the actuator is to be used. Preferably the breaking of the ampoule takes place by the use of some device such as an operating or adjusting spring which operates against the base 5 so that there is immediately available a counterforce or resistance against the effects of the working fluid if it becomes effective. This avoids loading the bellows with an unresisted force developed by the working fluid.

The ampoule 10 may be made in any desired shape. A tubular shape has been found to resist the sharp edges 7, 8 if made of glass or plastic. If made of glass it has been found that a glass structure which will break into many fine pieces upon application of mechanical force efficiently to rupture the ampoule will result in the small pieces not in any way impeding the operation of the thermal system. Fusible synthetic materials may be used and the ampoule opened by indirect application of external heat by heating the actuator. The fusible synthetic material will apply itself uniformly to the walls of the working cavity upon fusing. Moreover, in the ampoules that are to be broken mechanically the diameter or cross section thereof should be less than the operational distance between the bases 5 and 7 so that upon breaking there will be no possibility of a sufficiently large piece remaining that would impede operation of the bellows.

While preferred embodiments of the invention have been shown and described it will be understood that many modifications and changes can be made within the true spirit and scope of the invention.

What I claim and desire to be secured by Letters Patent is:

1. For use in a thermal system of an automatic operator or controller, an actuator having a working space therein, an ampoule in said actuator in said working space containing a metered charge of working fluid comprising a temperature-responsive fluid causing said actuator to act in response to temperature changes and means for opening said ampoule while contained in said working space for allowing said working fluid to enter said working space upon opening of said ampoule.

2. An actuator according to claim 1, in which said actuator comprises means operable for opening said ampoule while contained in said actuator working space to allow the working fluid contents to be discharged into said working space.

3. An actuator according to claim 2, in which said ampoule is breakable by application of mechanical force and in which said actuator comprises extensible and contractable means extending into said working space operable selectively for breaking said ampoule.

4. An actuator according to claim 1, comprising a bellows system defining said working space, and said ampoule comprising a breakable ampoule disposed in said bellows system working space in fixed position and breakable by extension of said bellows system.

References Cited
UNITED STATES PATENTS

| | | | |
|---|---|---|---|
| 2,976,897 | 3/1961 | Beckworth | 141—19 X |
| 3,390,365 | 6/1968 | Lindberg | 337—326 |

HOUSTON S. BELL, JR., Primary Examiner

U.S. Cl. X.R.
141—19; 236—99